(12) United States Patent
Lu et al.

(10) Patent No.: US 12,555,638 B2
(45) Date of Patent: Feb. 17, 2026

(54) ERASE PULSE LOOP DEPENDENT ADJUSTMENT OF SELECT GATE ERASE BIAS VOLTAGE

(71) Applicant: Micron Technology, Inc., Boise, ID (US)

(72) Inventors: Ching-Huang Lu, Fremont, CA (US); Vinh Quang Diep, Hayward, CA (US); Avinash Rajagiri, Boise, ID (US); Yingda Dong, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 252 days.

(21) Appl. No.: 18/235,183

(22) Filed: Aug. 17, 2023

(65) Prior Publication Data
US 2024/0071515 A1    Feb. 29, 2024

Related U.S. Application Data

(60) Provisional application No. 63/400,500, filed on Aug. 24, 2022.

(51) Int. Cl.
*G11C 16/16* (2006.01)
*G11C 16/04* (2006.01)

(52) U.S. Cl.
CPC .......... *G11C 16/16* (2013.01); *G11C 16/0483* (2013.01)

(58) Field of Classification Search
CPC ............................ G11C 16/16; G11C 16/0483
See application file for complete search history.

(56) References Cited

U.S. PATENT DOCUMENTS

| | | | |
|---|---|---|---|
| 9,922,705 B1* | 3/2018 | Diep | G11C 16/24 |
| 2019/0244673 A1* | 8/2019 | Yang | G11C 16/14 |
| 2019/0378574 A1* | 12/2019 | Lee | G11C 11/5635 |
| 2020/0411122 A1* | 12/2020 | Song | G11C 16/349 |
| 2022/0076756 A1* | 3/2022 | Lee | G11C 16/0433 |
| 2024/0363168 A1* | 10/2024 | Prakash | G11C 16/14 |

* cited by examiner

*Primary Examiner* — Amir Zarabian
*Assistant Examiner* — Justin Bryce Heisterkamp
(74) *Attorney, Agent, or Firm* — Lowenstein Sandler LLP

(57) ABSTRACT

Control logic of a memory device to initiate an erase operation including a set of erase loops to erase one or more memory cells of the memory device. During a first erase loop of the set of erase loops, a first erase pulse having an erase voltage level is caused to be applied to a source line associated with the one or more memory cells. During the first erase loop, a first erase bias voltage having an initial voltage level is caused to be applied to a first select gate and a second erase bias voltage having the initial voltage level is caused to be applied to a second select gate associated with the source line, where the first erase bias voltage level is based on a first delta voltage level. During a subset of erase loops following the first erase loop, a second erase pulse having the erase voltage level is caused to be applied to the source line. During the subset of erase loops, a first adjusted erase bias voltage is caused to be applied to the first select gate and a second adjusted erase bias voltage is caused to be applied to the second select gate.

20 Claims, 10 Drawing Sheets

|  350₀ | 350₁ | 350₂ | 350₃ |
|---|---|---|---|
| Block₀ 250₀ | Block₀ 250₀ | Block₀ 250₀ | Block₀ 250₀ |
| Block₁ 250₁ | Block₁ 250₁ | Block₁ 250₁ | Block₁ 250₁ |
| Block₂ 250₂ | Block₂ 250₂ | Block₂ 250₂ | Block₂ 250₂ |
| Block₃ 250₃ | Block₃ 250₃ | Block₃ 250₃ | Block₃ 250₃ |
| Block₄ 250₄ | Block₄ 250₄ | Block₄ 250₄ | Block₄ 250₄ |
| ⋮ | ⋮ | ⋮ | ⋮ |
| Block_{L-4} 250_{L-4} | Block_{L-4} 250_{L-4} | Block_{L-4} 250_{L-4} | Block_{L-4} 250_{L-4} |
| Block_{L-3} 250_{L-3} | Block_{L-3} 250_{L-3} | Block_{L-3} 250_{L-3} | Block_{L-3} 250_{L-3} |
| Block_{L-2} 250_{L-2} | Block_{L-2} 250_{L-2} | Block_{L-2} 250_{L-2} | Block_{L-2} 250_{L-2} |
| Block_{L-1} 250_{L-1} | Block_{L-1} 250_{L-1} | Block_{L-1} 250_{L-1} | Block_{L-1} 250_{L-1} |
| Block_L 250_L | Block_L 250_L | Block_L 250_L | Block_L 250_L |
| 240₀ | 240₁ | 240₂ | 240₃ |

FIG. 3

FIRST ERASE LOOP
(Erase Pulse 1)

ERASE PULSE LOOP DEPENDENT ADJUSTMENT OF SELECT GATE ERASE BIAS VOLTAGE

CROSS-REFERENCE TO RELATED APPLICATION

This application claims the benefit of U.S. Provisional Application No. 63/400,500, titled "Erase Pulse Loop Dependent Adjustment of Select Gate Erase Bias Voltage," filed Aug. 24, 2022, which is hereby incorporated herein by reference in its entirety.

TECHNICAL FIELD

Embodiments of the disclosure relate generally to memory sub-systems, and more specifically, relate to applying an erase pulse loop dependent adjustment of select gate erase bias voltage in an erase operation of memory cells in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 is a block schematic of a portion of an array of memory cells as could be used in a memory of the type described with reference to FIG. 1B according to an embodiment.

DETAILED DESCRIPTION

Figure 1A:
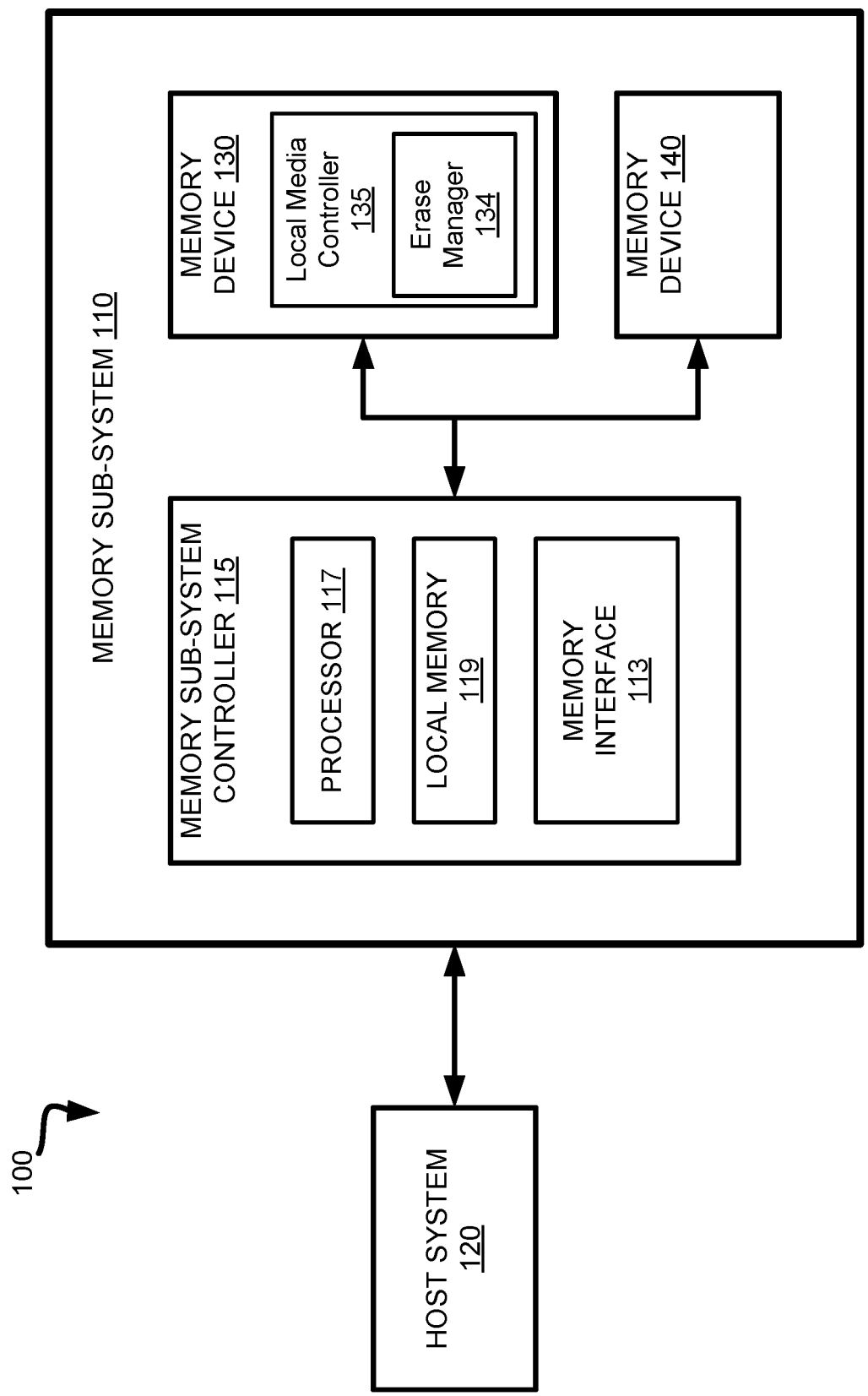
FIG. 1A illustrates an example computing system that includes a memory sub-system in accordance with some embodiments.

Aspects of the present disclosure are directed to applying an erase pulse loop dependent select gate source voltage in an erase operation of memory cells in a memory sub-system. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIGS. 1A-1B. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device (e.g., a memory die) can include multiple memory cells arranged in a two-dimensional or three-dimensional grid. The memory cells are formed onto a silicon wafer in an array of columns (also hereinafter referred to as bitlines) and rows (also hereinafter referred to as wordlines). A wordline can refer to one or more conductive lines of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane. As these processing threads operate independently, the power usage and requirements associated with each processing thread also varies.

A block hereinafter refers to a unit of the memory device used to store data and can include a group of memory cells, a wordline group, a wordline, or individual memory cells. Each block can include a number of sub-blocks, where each sub-block is defined by an associated pillar (e.g., a vertical conductive trace) extending from a shared bitline. Memory pages (also referred to herein as "pages") store one or more bits of binary data corresponding to data received from the host system. To achieve high density, a string of memory cells in a non-volatile memory device can be constructed to include a number of memory cells at least partially surrounding a pillar of poly-silicon channel material (i.e., a channel region). The memory cells can be coupled to access lines (i.e., wordlines) often fabricated in common with the memory cells, so as to form an array of strings in a block of memory (e.g., a memory array). The compact nature of certain non-volatile memory devices, such as 3D flash NAND memory, means wordlines are common to many memory cells within a block of memory. Some memory devices use certain types of memory cells, such as triple-level cell (TLC) memory cells, which store three bits of data in each memory cell, which make it affordable to move more applications from legacy hard disk drives to newer memory sub-systems, such as NAND solid-state drives (SSDs).

Some memory devices can be three-dimensional (3D) memory devices (e.g., 3D NAND devices). For example, a 3D memory device can include memory cells that are placed between sets of layers including a pillar (e.g., polysilicon pillar), a tunnel oxide layer, a charge trap (CT) layer, and a dielectric (e.g., oxide) layer. A 3D memory device can have a "top deck" corresponding to a first side and a "bottom deck" corresponding to a second side. Without loss of generality, the first side can be a drain-side and the second side can be a source-side. For example, a 3D memory device can be a 3D replacement gate memory device having a replacement gate structure using wordline stacking.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage $V_T$ (also referred to as the "threshold voltage") such that the source-drain electric current is low for the control gate voltage ($V_{CG}$) being below the threshold voltage, $V_{CG}<V_T$. The current increases substantially once the control gate voltage has exceeded the threshold voltage, $V_{CG}>V_T$. Because the actual geometry of the electrodes and gates varies from cell to cell, the threshold voltages can be different even for cells implemented on the same die. The cells can, therefore, be characterized by a distribution P of the threshold voltages, $P(Q,V_T)=dW/dV_T$, where dW represents the probability that any given cell has its threshold voltage within the interval $[V_T, V_T+dV_T]$ when charge Q is placed on the cell.

One type of cell is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

The array of memory cells is arranged such that the control gate of each memory cell of a row of the array is connected to a wordline. Columns of the array include strings (often termed "strings") of memory cells connected together in series, source to drain, between a pair of select lines, a source select line and a drain select line. The source select line includes a source select gate at each intersection between a NAND string and the source select line, and the drain select line includes a drain select gate at each intersection between a NAND string and the drain select line. The select gates are typically field-effect transistors. Each source select gate is connected to a source line, while each drain select gate is connected to a column bitline.

The memory array can be arranged in rows (each corresponding to a wordline) and columns (each corresponding to a bitline). Each column can include a string of series-connected memory cells (e.g., non-volatile memory cells), also referred to as a memory string. Each memory string can include a set of memory cells that can be selectively connected to a common source line (SRC) or source line (SL). Some memory devices are configured in accordance with a lateral contact architecture in which the N+ doped source line makes lateral contact with the pillar channel. Inside the pillar channel are a series of select gates (SGS0, SGS1, etc.).

The source line diffuses through the pillar channel to reach the first select gate (SGS0). The diffusion is to be sufficiently deep to traverse an overlap region (also referred to as a source overlap) between the source line and the first select gate. However, the N+ diffusion from the source line to the pillar channel has large pillar-to-pillar variation resulting in an under-diffused source overlap region. Accordingly, for some pillars, under-diffusion of the source overlap region prevents the N+ diffusion to reach the first select gate (SGS0) and turn on the pillar channel. The high resistance region of the pillar channel causes a bottleneck which prevents the string current from conducting to SGS0.

During an erase operation, a series of loops or erase pulses are applied to the source line at an erase voltage level (Vs1 or Vera) to ramp the source line to a maximum or final erase voltage level (Vera_final), such as approximately 16V to 22V. During all of the erase loop, erase bias voltages are applied to the SGS0 (e.g., the first select gate) and SGS1 (e.g., the second select gate that is adjacent to the first select gate) at an erase bias voltage level that is equal to the Vs1 reduced by a constant delta voltage (Vdelta), where Vdelta is in a range of approximately 0V to 2V.

At an early phase of the erase voltage ramping, a gate-induced drain leakage (GIDL) associated with SGS0 is weak. Since the channel potential relies on the SGD GIDL to charge up, it takes time for the SGD GIDL current to charge up the channel potential of an entire pillar. In addition, a "trap-up" of hot electrons occurs in the overlap region between the source line and SGS0 due to the large electric field that is caused by the voltage delta (Vdelta) between Vs1 and Vsgs0 causes an electric field. Furthermore, because of the incoming data pattern, data wordlines have a negative channel potential at the beginning of the erase operation, which enlarges the channel potential gradient between the source line and SGS0 and further increases the severity of the SGS0 trap-up.

Accordingly, after a number of program/erase (PE) cycles, the trap-up increases which makes it more and more difficult to turn on SGS0 (e.g., higher trap-up can be exhibited on higher threshold voltage pillars). The higher trap-up can prevent the erase operation from successfully completing and cause an erase failure. Disadvantageously, the resistance in the source overlap region can increase with higher P/E cycle levels and lower temperatures and result in the failure of the erase operation and reduced endurance performance.

According to aspects of the present disclosure, an erase operation having a loop dependent adjustment of erase bias voltage levels applied to select gates (SGS0 and SGS1) is executed to minimize SGS0 trap-up and reduce the risk of erase operation failure. In an embodiment, the erase operation includes a series of erase loops each including the application of an erase pulse to a source line associated with a set of target memory cells to be erased (e.g., erase loop 1 including the application of erase pulse 1 (Pulse1) to the source line, erase loop 2 including the application of erase pulse 2 (Pulse2) to the source line, . . . . and erase loop N including the application of erase pulse N (PulseN) to the source line). During each erase loop, an erase bias voltage is applied to a first select gate (SGS0) and a second select gate (SGS1) of a memory device of a memory sub-system. In an embodiment, the first erase pulse (Pulse1) is applied to ramp the source line to a final erase voltage level (Vs1=Vera_final). During the first erase loop, a first erase bias voltage level is applied to SGS0 (Vsgs0) and SGS1 (Vsgs1). The first erase bias voltage level (Vsgs0 and Vsgs1) applied during the first erase loop is the source line erase voltage (Vs1 or Vera) reduced by a delta or offset voltage (Vdelta_initial).

In an embodiment, the erase operation includes erase loop dependent adjustment of the Vdelta used in setting the erase bias voltage applied to SGS0 and SGS1 during a second erase loop and all subsequent erase loops until the erase operation is complete (e.g., erase loop 2, erase loop 3, erase loop 4 . . . and erase loop N). In an embodiment, a first adjusted delta voltage (Vdelta_adjusted1) is used to adjust the erase bias voltage applied to SGS0 (Vsgs0) and a second adjusted delta voltage (Vdelta_adjusted2) is used to adjust the erase bias voltage applied to SGS1 during all erase loops following the first erase loop (e.g., the second erase loop to the Nth erase loop). In an embodiment, the Vsgs0 applied during the second erase loop and all subsequent erase loops is determined by reducing the Vs1 or Vera voltage level applied to the source line by the first adjusted delta voltage (Vdelta_adjusted1). In an embodiment, the first adjusted delta voltage (Vdelta_adjusted1) is approximately 12V. In an embodiment, the Vsgs1 applied during the second erase loop and all subsequent erase loops is determined by reducing the Vera voltage level applied to the source line by the second adjusted delta voltage (Vdelta_adjusted2). In an embodiment, the second adjusted delta voltage (Vdelta_adjusted2) is approximately 4V.

According to embodiments, instead of using the same erase bias levels for SGS0 and SGS1 for all erase loops, erase loop-dependent adjusted delta voltages can be used to establish the erase bias voltage levels applied to the first select gate (SGS0) and the second select gate (SGS1) during the second erase loop and all subsequent erase loops until the erase operation is completed. Advantageously, use of reduced erase bias voltages (relative to the erase voltage level of the erase pulse applied to the source line) for the first select gate (SGS0) and the second select gate (SGS1) during all erase loops following the first erase loop (e.g., the second erase loop to the Nth or final erase loop) minimizes SGS0 trap-up and reduces the risk of erase operation failure.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. In one embodiment, the term "MLC memory" can be used to represent any type of memory cell that stores more than one bit per cell (e.g., 2 bits, 3 bits, 4 bits, or 5 bits per cell).

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In one embodiment, memory device 130 includes an erase manager configured to carry out corresponding memory access operations, in response to receiving the memory access commands from memory interface 113. In some embodiments, the local media controller 135 includes at least a portion of erase manager 134 and is configured to perform the functionality described herein. In some embodiments, erase manager 134 is implemented on memory device 130 using firmware, hardware components, or a combination of the above. In one embodiment, erase manager 134 receives, from a requestor, such as memory interface 113, a request to erase data from a set of target memory cells of a memory array of memory device 130. The memory array can include an array of memory cells formed at the intersections of wordlines and bitlines. In one embodiment, the memory cells are grouped into blocks, which can be further divided into sub-blocks, where a given wordline is shared across a number of sub-blocks, for example. In one embodiment, each sub-block corresponds to a separate plane in the memory array. The group of memory cells associated with a wordline within a sub-block is referred to as a physical page. In one embodiment, there can be multiple portions of the memory array, such as a first portion where the sub-blocks are configured as SLC memory and a second portion where the sub-blocks are configured as multi-level cell (MLC) memory (i.e., including memory cells that can store two or more bits of information per cell). For example, the second portion of the memory array can be configured as TLC memory. The voltage levels of the memory cells in TLC memory form a set of eight (8) programming distributions representing the 8 different combinations of the three bits stored in each memory cell. Depending on how the memory cells are configured, each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and QLC physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page.

In one embodiment, erase manager 134 can execute an erase operation having a loop dependent adjustment of erase bias voltage levels applied to select gates (SGS0 and SGS1). In an embodiment, the erase manager 134 initiates execution of the erase operation to erase a set of target memory cells of the memory device 130. In an embodiment, the erase operation includes a series of erase loops, where each erase loop includes the application of an erase pulse to a source line associated with a set of target memory cells to be erased. In a first erase loop, the erase manager 134 causes a first erase pulse (Pulse1) to be applied to the source line to ramp the voltage (Vera) on the source line (Vs1) to a final erase voltage level (Vera_final). In an embodiment, in the first erase loop, the erase manager 134 causes a first erase bias voltage level to be applied to a first select gate (Vsgs0 applied to SGS0) and a second select gate (Vsgs1 applied to SGS1). The first erase bias voltage level applied to the first select gate (Vsgs0) and the second select gate (Vsgs1) during the first erase loop is equal to the source line erase voltage (Vs1 or Vera) reduced by a delta or offset voltage (Vdelta_initial).

In an embodiment, the erase manager 134 executes an erase loop dependent adjustment of the Vdelta used in setting the erase bias voltage applied to SGS0 and SGS1 during all erase loops following the first erase loops (e.g., a second erase loop and all subsequent erase loops, collectively referred to as the "one or more subsequent erase loops") until the erase operation is completed (e.g., erase loop 2, erase loop 3, erase loop 4 . . . and erase loop N). In an embodiment, the erase manager 134 establishes a first adjusted delta voltage (Vdelta_adjusted1) that is used to adjust the erase bias voltage applied to SGS0 (Vsgs0) and establishes a second adjusted delta voltage (Vdelta_adjusted2) that is used to adjust the erase bias voltage applied to SGS1 during all erase loops following the first erase loop (e.g., the second erase loop to the Nth erase loop). In an embodiment, the erase manager 134 causes application of an adjusted erase bias voltage level (Vsgs0_adjusted) to SGS0 during the second erase loop and all subsequent erase loops, where Vsgs0_adjusted is determined by reducing the Vera voltage level applied to the source line by the first adjusted delta voltage (Vdelta_adjusted1). In an embodiment, the first adjusted delta voltage (Vdelta_adjusted1) used to establish Vsgs0_adjusted is in a range of approximately 11V to approximately 13V. In an embodiment, the erase manager 134 causes application of an adjusted erase bias voltage (Vsgs1_adjusted) to SGS1 during the second erase loop and all subsequent erase loops, where Vsgs1_adjusted is determined by reducing the Vera voltage level applied to the source line by a second adjusted delta voltage (Vdelta_adjusted2). In an embodiment, the second adjusted delta voltage (Vdelta_adjusted2) used to establish Vsgs1_adjusted is in a range of approximately 2V to approximately 4V.

Figure 1B:
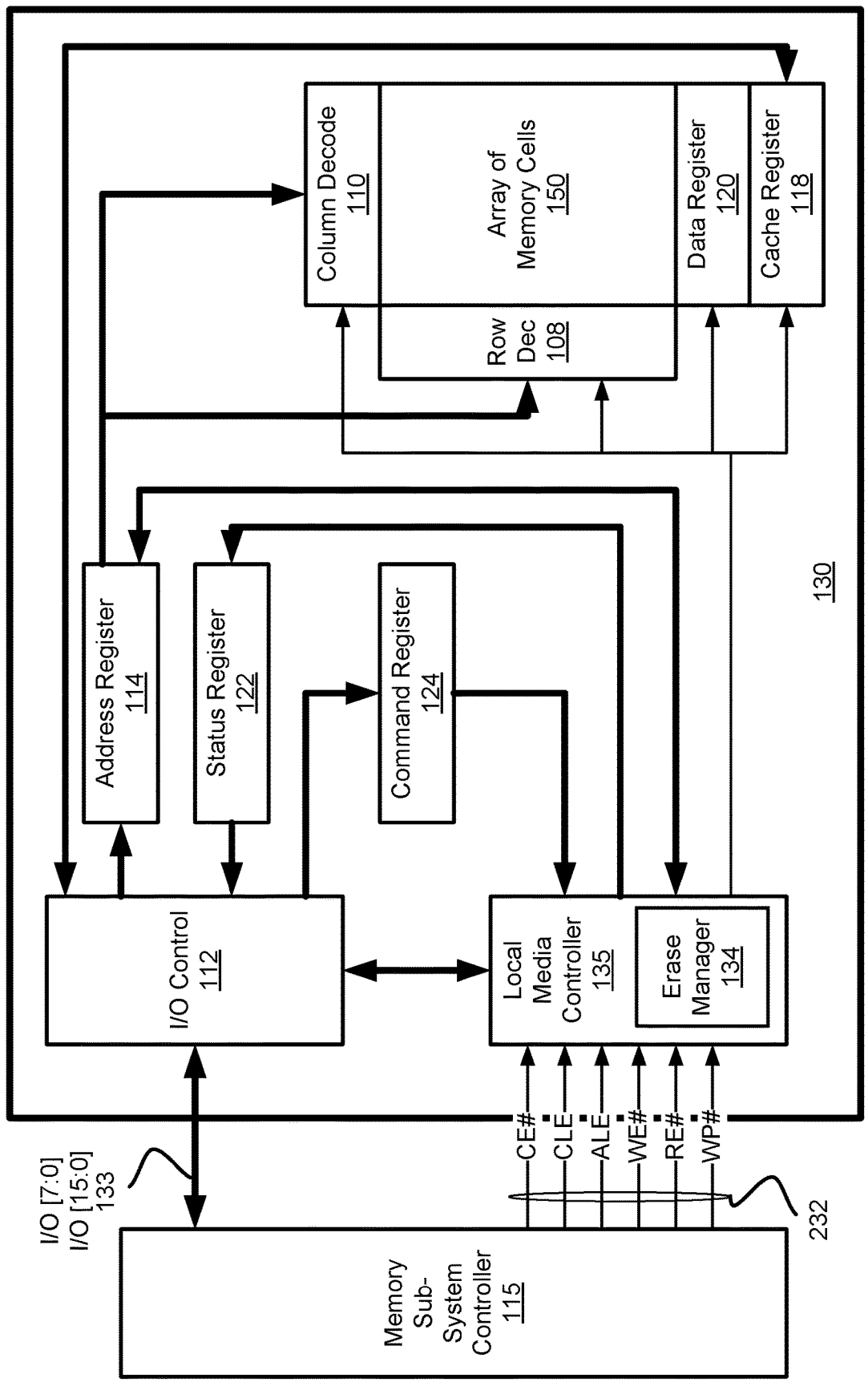
FIG. 1B is a block diagram of a memory device in communication with a memory sub-system controller of a memory sub-system according to an embodiment.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device. In one embodiment, the local media controller 135 includes erase manager 134, which can implement the loop dependent erase bias voltage adjustments applied to the first select gate (SGS0) and the second select gate (SGS1) during an erase operation to erase a set of memory cells of memory device 130, as described herein.

Memory device 130 includes an array of memory cells 150 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 250 are capable of being programmed to one of at least two target data states.

Row decode circuitry 108 and column decode circuitry 110 are provided to decode address signals. Address signals are received and decoded to access the array of memory cells 150. Memory device 130 also includes input/output (I/O) control circuitry 112 to manage input of commands, addresses and data to the memory device 130 as well as output of data and status information from the memory device 130. An address register 114 is in communication with I/O control circuitry 212 and row decode circuitry 108 and column decode circuitry 110 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 150 in response to the commands and generates status information for the external memory sub-system controller 115, i.e., the local media controller 135 is configured to perform access operations (e.g., read operations, programming operations and/or erase operations) on the array of memory cells 150. The local media controller 135 is in communication with row decode circuitry 108 and column decode circuitry 110 to control the row decode circuitry 108 and column decode circuitry 110 in response to the addresses.

The local media controller 135 is also in communication with a cache register 118. Cache register 118 latches data, either incoming or outgoing, as directed by the local media controller 135 to temporarily store data while the array of memory cells 150 is busy writing or reading, respectively, other data. During a program operation (e.g., write operation), data may be passed from the cache register 118 to the data register 170 for transfer to the array of memory cells 150; then new data may be latched in the cache register 118 from the I/O control circuitry 212. During a read operation, data may be passed from the cache register 118 to the I/O control circuitry 112 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 150, e.g., by sensing a state of a data line connected to that memory cell. A status register 122 may be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 131 and outputs data to the memory sub-system controller 115 over I/O bus 131.

For example, the commands may be received over input/output (I/O) pins [7:0] of I/O bus 131 at I/O control circuitry 112 and may then be written into command register 124. The addresses may be received over input/output (I/O) pins [7:0] of I/O bus 234 at I/O control circuitry 112 and may then be written into address register 114. The data may be received over input/output (I/O) pins [7:0] for an 8-bit device or input/output (I/O) pins [15:0] for a 16-bit device at I/O control circuitry 112 and then may be written into cache register 118. The data may be subsequently written into data register 170 for programming the array of memory cells 150.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2A:
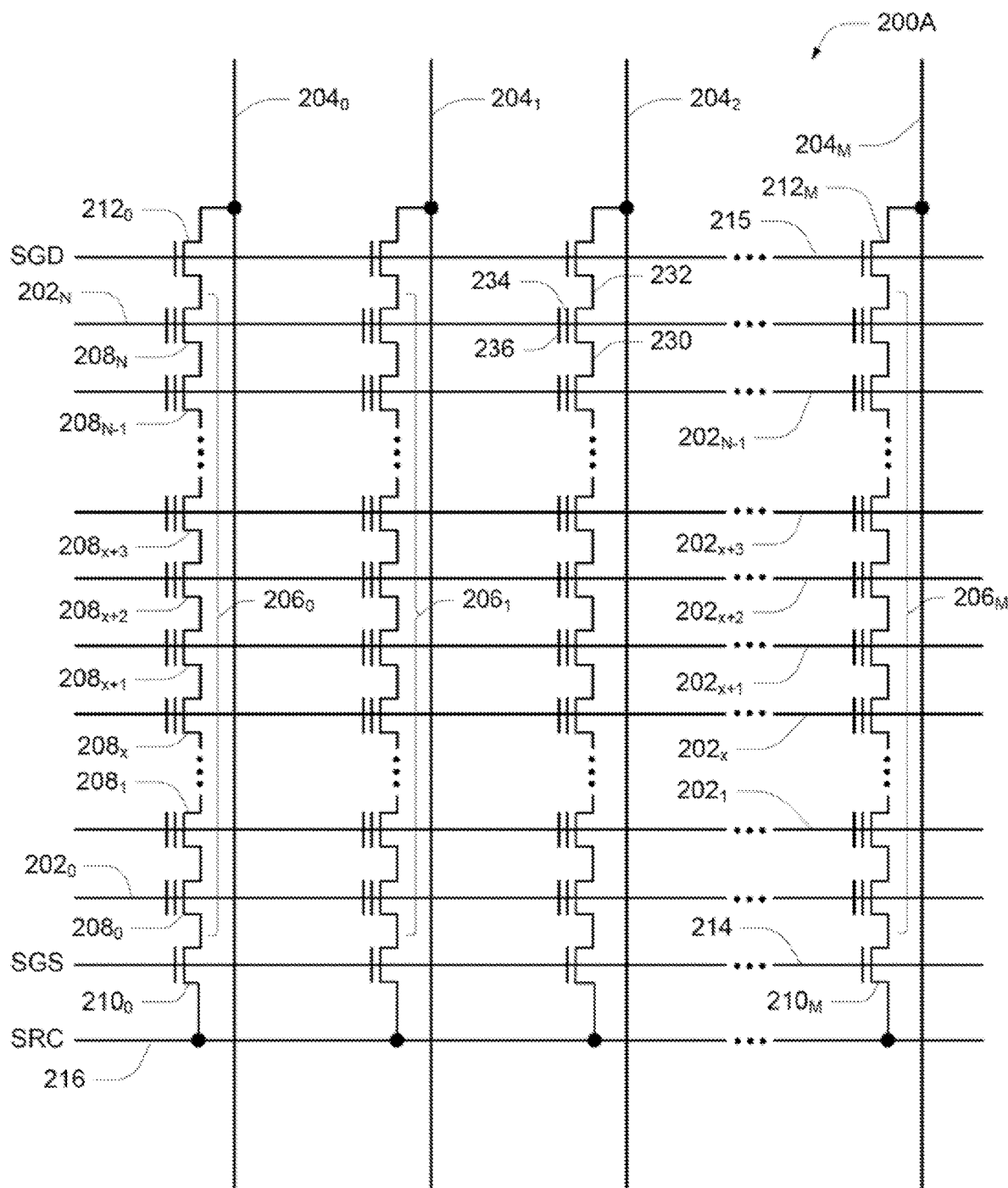
FIGS. 2A-2C are schematics of portions of an array of memory cells as could be used in a memory of the type described with reference to FIG. 1B according to an embodiment.
Figure 2B:
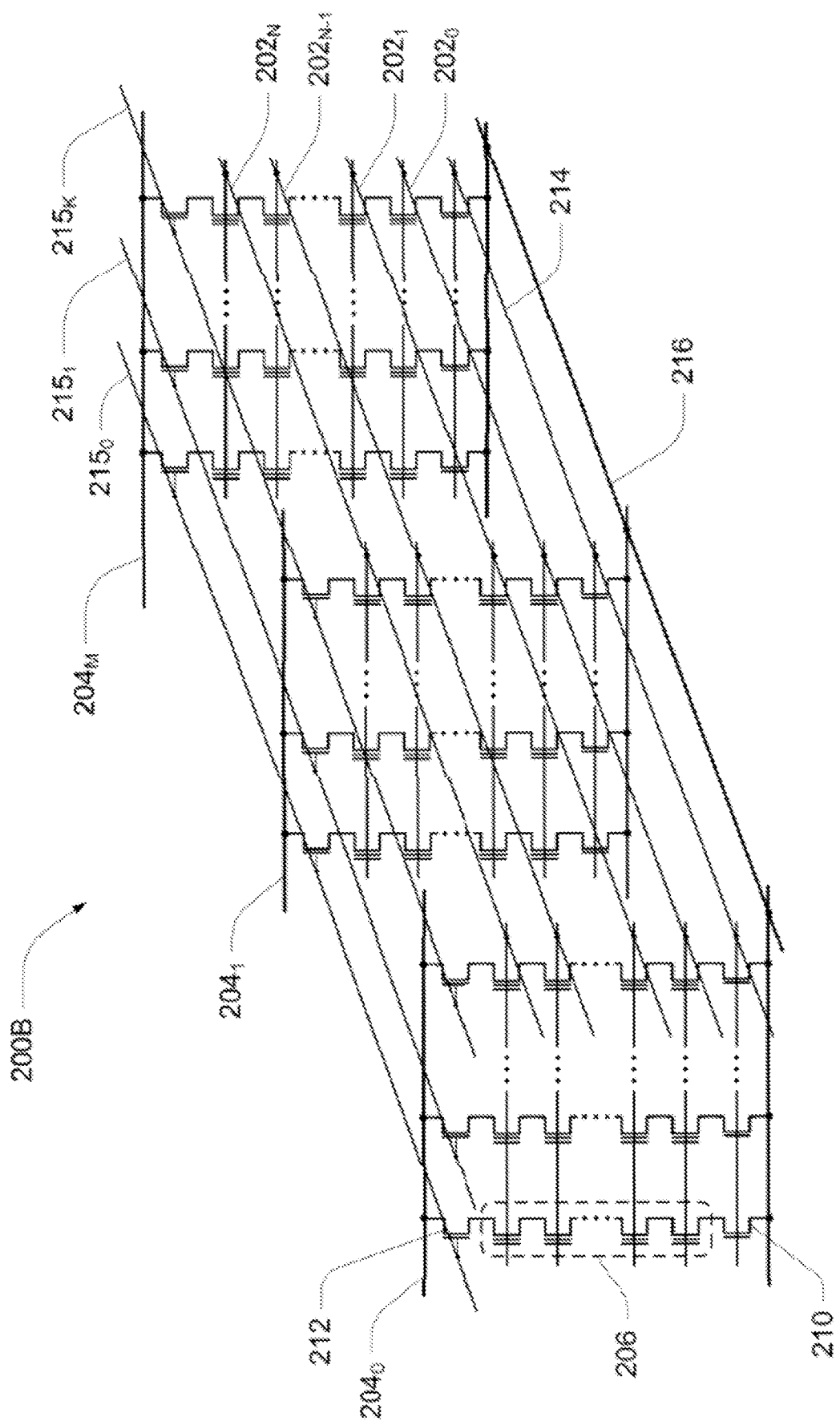
Figure 2C:
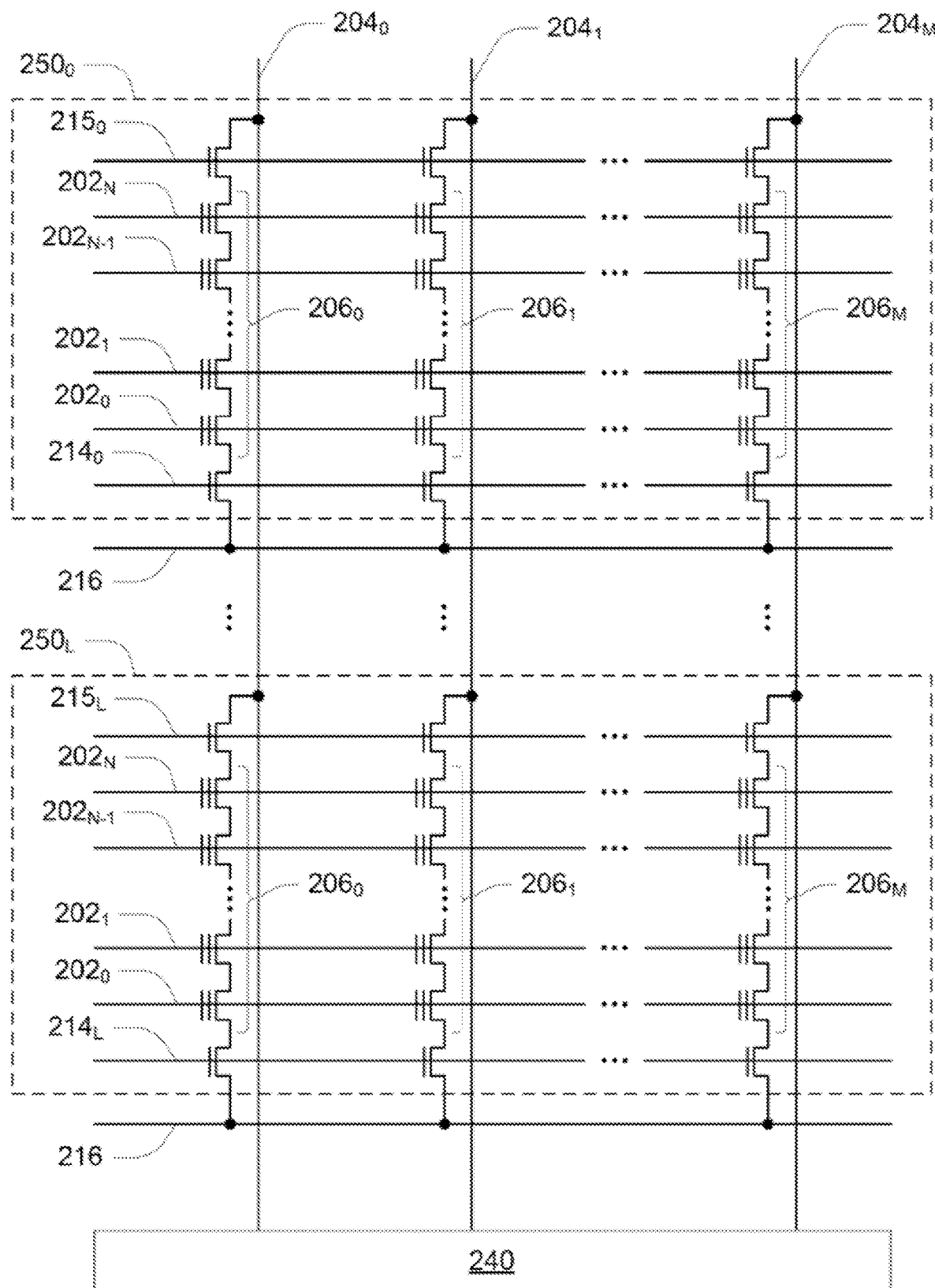

FIG. 2A-2C are schematics of portions of an array of memory cells 200A, such as a NAND memory array, as could be used in a memory of the type described with reference to FIG. 1B according to an embodiment, e.g., as a portion of the array of memory cells 104. Memory array 200A includes access lines, such as wordlines $202_0$ to $202_N$, and data lines, such as bitlines $204_0$ to $204_M$. The wordlines 202 can be connected to global access lines (e.g., global wordlines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a wordline 202) and columns (each corresponding to a bitline 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Source-side select gates $210_0$ to $210_M$ can be commonly connected to a select line 214, such as a source select line, and drain-side select gates (SGD) $212_0$ to $212_M$ can be commonly connected to a select line 215, such as a drain select line. Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $212_0$ can be connected to the bitline $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bitline 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bitlines 204 (e.g., bitlines $204_0$, $204_2$, $204_4$, etc.) can be one physical page of the memory cells 208 (e.g., even memory cells) while memory cells 208 commonly connected to wordline $202_N$ and selectively connected to odd bitlines 204 (e.g., bitlines $204_1$, $204_3$, $204_5$, etc.) can be another physical page of the memory cells 208 (e.g., odd memory cells).

Although bitlines $204_3$-$204_5$ are not explicitly depicted in FIG. 2A, it is apparent from the figure that the bitlines 204 of the array of memory cells 200A can be numbered consecutively from bitline $204_0$ to bitline $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

FIG. 2B is another schematic of a portion of an array of memory cells 200B as could be used in a memory of the type described with reference to FIG. 1B, e.g., as a portion of the array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars where a portion of a pillar can act as a channel region of the memory cells of NAND strings 206. The NAND strings 206 can be each selectively connected to a bitline $204_0$-$204_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $215_0$-$215_K$ to selectively activate particular select transistors 212 each between a NAND string 206 and a bitline 204. The select transistors 210 can be activated by biasing the select line 214. Each wordline 202 can be connected to multiple rows of memory cells of the memory array 200B. Rows of memory cells that are commonly connected to each other by a particular wordline 202 can collectively be referred to as tiers.

FIG. 2C is a further schematic of a portion of an array of memory cells 200C as could be used in a memory of the type described with reference to FIG. 1B, e.g., as a portion of the array of memory cells 104. Like numbered elements in FIG. 2C correspond to the description as provided with respect to FIG. 2A. The array of memory cells 200C can include strings of series-connected memory cells (e.g., NAND strings) 206, access (e.g., word) lines 202, data (e.g., bit) lines 204, select lines 214 (e.g., source select lines), select lines 215 (e.g., drain select lines) and a source 216 as depicted in FIG. 2A. A portion of the array of memory cells 200A can be a portion of the array of memory cells 200C, for example.

FIG. 2C depicts groupings of NAND strings 206 into blocks of memory cells 250, e.g., blocks of memory cells $250_0$-$250_L$. Blocks of memory cells 250 can be groupings of memory cells 208 that can be erased together in a single erase operation, sometimes referred to as erase blocks. Each block of memory cells 250 can represent those NAND strings 206 commonly associated with a single select line 215, e.g., select line $215_0$. The source 216 for the block of memory cells $250_0$ can be a same source as the source 216 for the block of memory cells $250_L$. For example, each block of memory cells $250_0$-$250_L$ can be commonly selectively connected to the source 216. Access lines 202 and select lines 214 and 215 of one block of memory cells 250 can have no direct connection to access lines 202 and select lines 214 and 215, respectively, of any other block of memory cells of the blocks of memory cells $250_0$-$250_L$.

The bitlines $204_0$-$204_M$ can be connected (e.g., selectively connected) to a buffer portion 240, which can be a portion of the page buffer 152 of the memory device 130. The buffer portion 240 can correspond to a memory plane (e.g., the set of blocks of memory cells $250_0$-$250_L$). The buffer portion 240 can include sense circuits (which can include sense amplifiers) for sensing data values indicated on respective bitlines 204.

FIG. 3 is a block schematic of a portion of an array of memory cells 300 as could be used in a memory of the type described with reference to FIG. 1B. The array of memory cells 300 is depicted as having four memory planes 350 (e.g., memory planes $350_0$-$350_3$), each in communication with a respective buffer portion 240, which can collectively form a page buffer 352. While four memory planes 350 are depicted, other numbers of memory planes 350 can be commonly in communication with a page buffer 352. Each memory plane 350 is depicted to include L+1 blocks of memory cells 250 (e.g., blocks of memory cells $250_0$-$250_L$).

Figure 4:
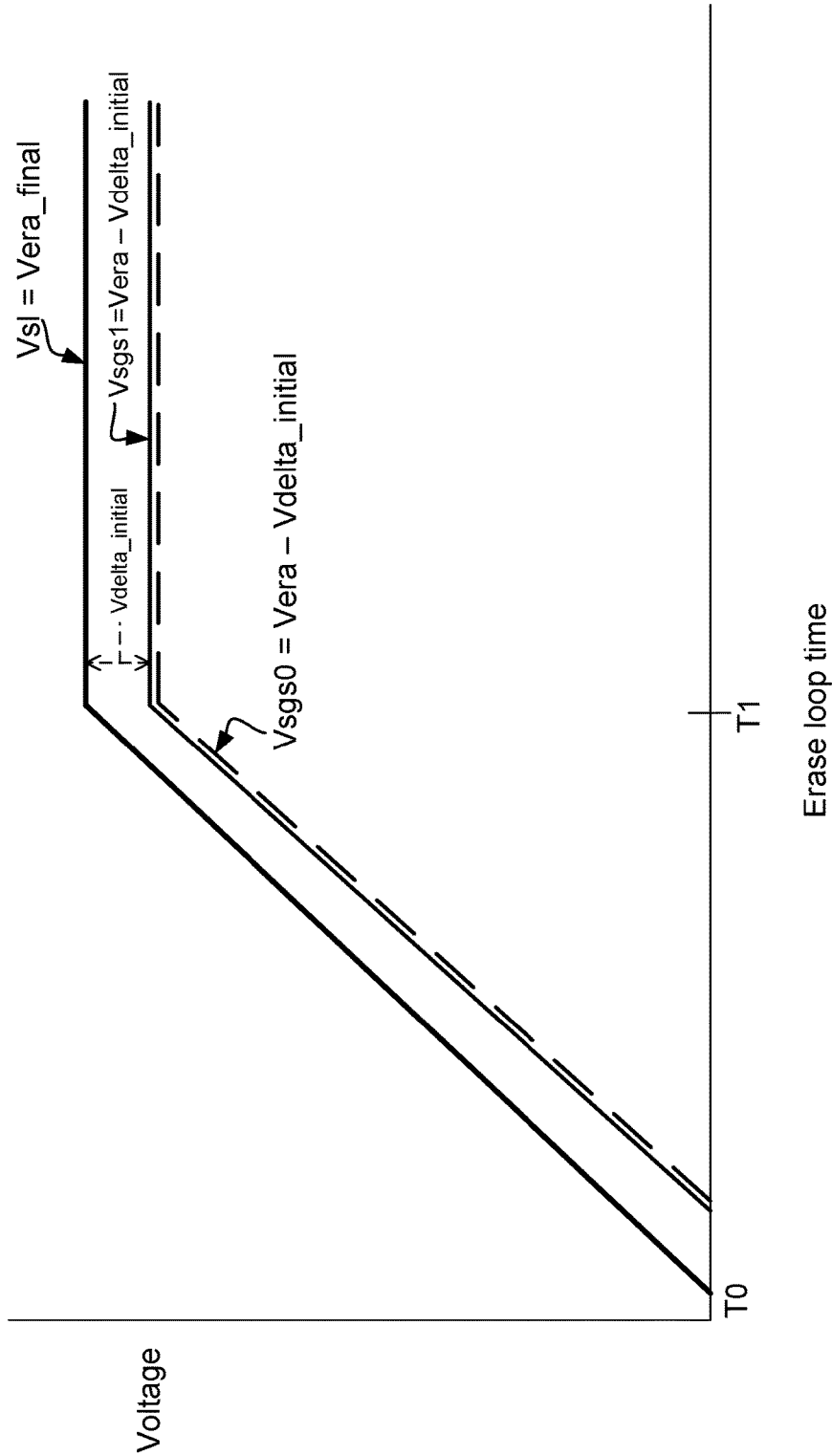
FIG. 4 illustrates example waveforms corresponding to execution of a first erase loop of a set of erase loops of an example erase operation including loop dependent adjustment of the erase bias voltage applied to a first select gate and a second select gate, in accordance with one or more embodiments of the present disclosure.

FIG. 4 illustrates example waveforms corresponding to execution of a first erase loop (e.g., erase loop 1) of a set of erase loops (e.g., erase loop 1, erase loop 2 . . . . erase loop N, where N is the final erase loop) of an example erase operation including loop dependent adjustment of the erase bias voltage applied to a first select gate (SGS0) and a second select gate (SGS1), in accordance with one or more embodiments of the present disclosure. As shown in FIG. 4, an erase operation or algorithm can be initiated at a first time (T0) to erase a set of one or more target memory cells of a memory device. During the first erase loop (e.g., erase pulse 1), an erase pulse is applied to the source line of the memory device to ramp the voltage to a final erase voltage level (Vera_final). As shown, at time T1, the voltage of the source line (Vs1) reaches Vera_final.

In an embodiment, during the first erase loop, a first erase voltage is applied to a first select gate (Vsgs0 applied to SGS0) and a second erase voltage is applied to a second select gate (Vsgs1 applied to SGS1). In an embodiment, in the first erase loop, Vsgs0 and Vsgs1 are equal to the source line erase voltage (Vs1) reduced by a first delta voltage (Vdelta_initial). Accordingly, during the first erase loop, the voltage applied to SGS0 (Vsgs0) and the voltage applied to SGS1 (Vsgs1) are represented by the following expressions:

$$Vsgs0 = Vs1 - Vdelta\_initial; \text{ and}$$

$$Vsgs1 = Vs1 - Vdelta\_initial,$$

where Vdelta_initial is a constant voltage level in a range of approximately 0V to approximately 2V.

According to embodiments, the initial delta voltage (Vdelta_initial) is used to determine Vsgs0 and Vsgs1 because, during the first erase pule, a negative channel potential caused by incoming data patterns enhance the channel potential gradient between the source line and SGS0, thereby increasing the severity of the SGS0 trap-up. In an embodiment, the negative channel potential due to the program data pattern enlarges the lateral field in the SGS0/SL junction, and as such, the first erase pulse has the least or smallest relative margin for SGS0 trap-up. Accordingly, to minimize SGS0 trap-up, SGS0 and SGS1 ramp up together with Vs1 during the ramp period and during the flattop period (where Vs1=Vera). As shown, the Vdelta_initial used to establish Vsgs0 and Vsgs1 represents a small voltage delta (e.g., 0V to 2V) relative to Vera.

According to embodiments, the erase operation proceeds following the first erase loop with the remainder of the set of erase loops until the erase operation is completed. The remaining erase loops includes a second erase loop, a third erase loop . . . and an Nth erase loop, until the erase operation is complete.

Figure 5:
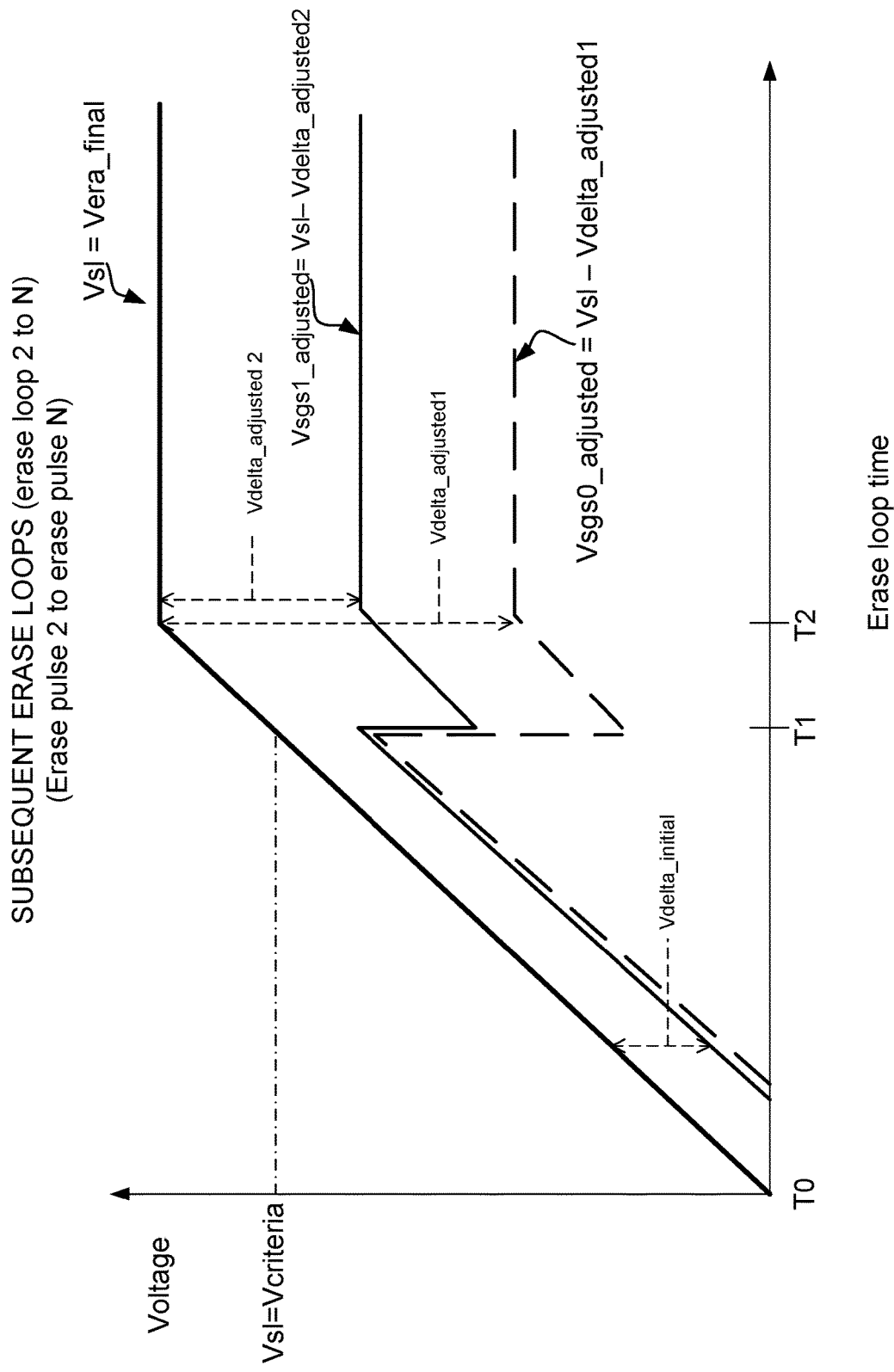
FIG. 5 illustrates example waveforms corresponding to execution of a subset of erase loops following a first erase loop of an example erase operation including loop dependent adjustment of the erase bias voltage applied to the first select gate and the second select gate, in accordance with one or more embodiments of the present disclosure.

FIG. 5 illustrates example waveforms corresponding to execution of the set of remaining or subsequent erase loops (e.g., a second erase loop, a third erase loop . . . and the Nth erase loop) of the set of erase loops of the example erase operation including loop dependent adjustment of the erase bias voltage applied to the first select gate (SGS0) and the second select gate (SGS1), in accordance with one or more embodiments of the present disclosure.

As shown in FIG. 5, each of the subsequent erase loops is initiated at T0 and includes the application of an erase pulse to the source line of the memory device to ramp the source line voltage to the final erase voltage level (Vera). During a first phase between T0 and T1 (e.g., a first phase of the subsequent erase loop), the Vsgs0 and Vsgs1 ramp up together with Vs1, where both SGS0 and SGS1 are biased at an erase voltage equal to Vs1 reduced by the initial delta voltage (Vdelta_initial) (e.g., a relatively small delta voltage in a range of approximately 0V to approximately 2V).

In an embodiment, during the subsequent erase loop (e.g., erase loop 2), after the Vsl reaches a certain criteria level condition (Vcriteria), a first adjusted Vdelta (Vdelta_adjusted1) is established for use in setting the erase bias voltage applied to Vsgs0 (Vsgs0_adjusted). In an embodiment, upon Vs1 reaching Vcriteria, a second adjusted Vdelta (Vdelta_adjusted2) is established for use in setting the erase bias voltage applied to Vsgs1 (Vsgs1_adjusted). In an embodiment, Vcriteria is in a range of Vera_final minus a voltage in a range of approximately 4V to approximately 6V.

As shown in FIG. 5, when Vs1 reaches Vcriteria at T1, Vdelta_initial is adjusted to Vsgs0_adjusted1 and used to establish Vsgs0_adjusted that is applied to Vsgs0). In addition, when Vs1 reaches Vcriteria at T1, Vdelta_initial is adjusted to Vsgs1_adjusted2 and used to establish Vsgs1_adjusted that is applied to Vsgs1). Accordingly, during a second phase the subsequent erase loop (e.g., a time following T1 when Vs1=Vcriteria), the adjusted erase bias voltage applied to SGS0 (Vsgs0_adjusted) and the voltage applied to SGS1 (Vsgs1_adjusted) are represented by the following expressions:

$$Vsgs0\_adjusted = Vs1 - Vdelta\_adjusted1;\ and$$

$$Vsgs1\_adjusted = Vs1 - Vdelta\_adjusted2,$$

where Vdelta_adjusted1 is a voltage level in a range of approximately 10V to approximately 14V, and where Vdelta_adjusted2 is a voltage level in a range of approximately 3V to approximately 6V. Accordingly, after Vs1 (Vera) ramps up to the preset criteria level (e.g., Vcriteria=Vera_final−5V), SGS0 is biased with an adjusted voltage (Vsgs0_adjusted) based on a first adjusted delta voltage (e.g., Vdelta_adjusted1 of approximately 12V) and SGS1 is biased with an adjusted voltage (Vsgs1_adjusted) based on a second adjusted delta voltage (e.g., Vdelta_adjusted2 of approximately 4V) so that SGS0 can be weakly erased. In an embodiment, the "weak" or "shallow" erase state of SGS0 is caused by application of a relatively low or weak Vsgs)_adjusted. The level and risk of SGS0 trap-up is relatively smaller during the subsequent erase loops (e.g., erase pulse 2 to erase pulse N), and therefore, the weak erase of SGS0 enables trap-up accumulated during program and read operations to be reduced. As shown in FIG. 5, the ramping of Vs1, Vsgs0_adjusted, and Vsgs1_adjusted continue following time T1 to time T2, when Vs1 reaches Vera_final.

According to embodiments, the erase operation proceeds following the completion of the final erase loop (erase loop N) when the erase operation is completed. According to embodiments, the loop dependent adjustment of the delta voltages used to establish the erase bias voltages applied to the first select gate (SGS0) and the second select gate (SGS1) is performed, in accordance with the waveforms shown in FIG. 5, for each of the erase loops following the first erase loop (e.g., the second erase loop, the third erase loop . . . and the Nth erase loop).

Figure 6:
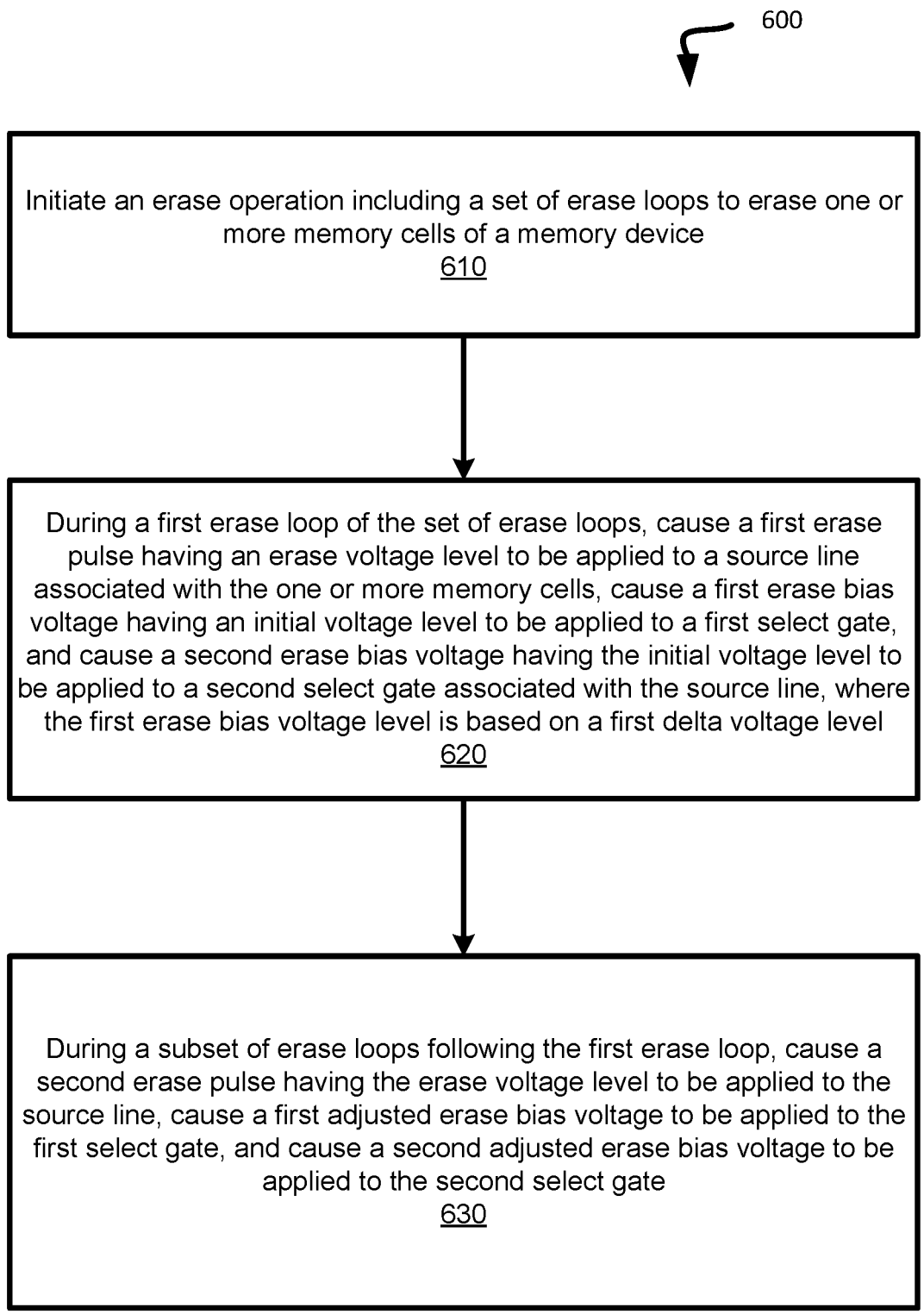
FIG. 6 is a flow diagram of an example method of a executing an erase operation including loop dependent adjustment of the erase bias voltage applied to the first select gate and the second select gate, in accordance with one or more embodiments of the present disclosure.

FIG. 6 illustrates an example process 600 relating to an erase operation to erase a set of memory cells of a memory device, where the erase operation includes a loop dependent adjustment of erase bias voltages applied to a first select gate and a second select gate, according to embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by erase manager 134 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, an operation is initiated. For example, processing logic (e.g., erase manager 134) can execute an erase operation including a set of erase loops to erase one or more memory cells of a memory device. In an embodiment, the processing logic can receive, from a requestor, such as a memory interface 113 of a memory sub-system controller 115, a request to perform the erase operation on the one or more memory cells to be erased, such as one or memory cells of memory array 250, of a memory device, such as memory device 130. In an embodiment, the processing logic identifies the one or more memory cells to be erased based on the one or more addresses provided as part of the request.

At operation 620, an erase pulse is applied. For example, during a first erase loop of the set of erase loops, the processing logic can cause a first erase pulse having an erase voltage level to be applied to a source line associated with the one or more memory cells, cause a first erase bias voltage having an initial voltage level to be applied to a first select gate, and cause a second erase bias voltage having the initial voltage level to be applied to a second select gate associated with the source line, where the initial voltage level is based on an initial delta voltage level. In an embodiment, the first erase bias voltage (Vsgs0) applied to the first select gate (SGS0) and the second erase bias voltage (Vsgs1) applied to the second select gate (SGS0) both have the initial voltage level that equals the erase voltage level applied to the source line (Vs1 or Vera) reduced by the initial delta voltage level (Vdelta_initial). According to embodiments, the initial delta voltage level (Vdelta_initial) is in a range of approximately 0V to approximately 2V.

At operation 630, an erase pulse is applied. For example, during a subset of erase loops following the first erase loop erase, the processing logic can cause a second erase pulse having the erase voltage level to be applied to the source line, cause a first adjusted erase bias voltage to be applied to the first select gate, and cause a second adjusted erase bias voltage to be applied to the second select gate. According to embodiments, the first adjusted erase bias voltage 1 applied to the first select gate (Vsgs0_adjusted) equals the erase voltage level applied to the source line (Vs1 or Vera) reduced by a first adjusted delta voltage level (Vdelta_adjusted1). According to embodiments, the second adjusted erase bias voltage applied to the second select gate (Vsgs1_adjusted) equals erase voltage level applied to the source line (Vs1 or Vera) reduced by a second adjusted delta voltage level (Vdelta_adjusted2). According to embodiments, the first adjusted delta voltage level (Vdelta_adjusted1) in a range of approximately 11V to approximately 13V. According to embodiments, the second adjusted delta voltage level (Vdelta_adjusted2) is in a range of approximately 2V to approximately 4V.

Advantageously, application of reduced erase bias voltages (relative to the erase voltage level of the erase pulse applied to the source line) to the first select gate (SGS0) and the second select gate (SGS1) during all erase loops following the first erase loop (e.g., the second erase loop to the Nth or final erase loop) minimizes SGS0 trap-up and reduces the risk of erase operation failure.

Figure 7:
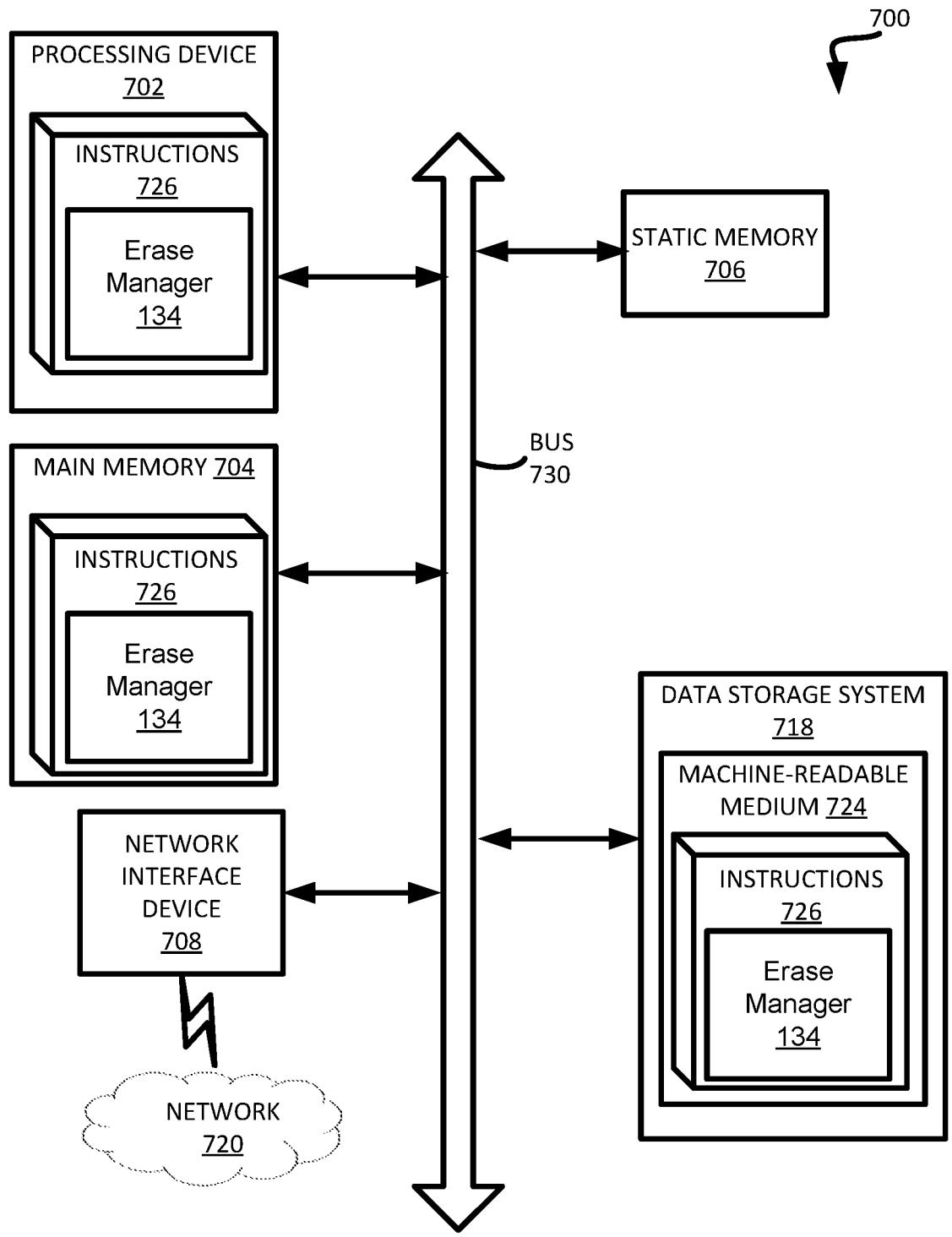
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to erase manager 134 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium, such as a non-transitory computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIGS. 1A and 1B.

In one embodiment, the instructions 726 include instructions to implement functionality corresponding to erase manager 134 of FIGS. 1A and 1B). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
an array of memory cells; and
control logic, operatively coupled with the array of memory cells, to perform operations comprising:
  initiating an erase operation including a set of erase loops to erase one or more memory cells of the array of memory cells;
  during a first erase loop of the set of erase loops:
    causing a first erase pulse having an erase voltage level to be applied to a source line associated with the one or more memory cells of the memory device;
    causing a first erase bias voltage having an initial voltage level to be applied to a first select gate adjacent to the source line, wherein the first erase bias voltage is based on a first delta voltage level; and
    causing a second erase bias voltage having the initial voltage level to be applied to a second select gate associated with the source line, wherein the second select gate is adjacent to the first select gate; and
  during a subset of erase loops following the first erase loop:
    causing a second erase pulse having the erase voltage level to be applied to the source line;
    causing a first adjusted erase bias voltage to be applied to the first select gate; and
    causing a second adjusted erase bias voltage to be applied to the second select gate, wherein the first adjusted erase bias voltage is less than the second adjusted erase bias voltage.

2. The memory device of claim 1, wherein the initial voltage level equals the erase voltage level minus the first delta voltage level.

3. The memory device of claim 1, wherein the first delta voltage level is in a range of approximately 0V to approximately 2V.

4. The memory device of claim 1, wherein the first adjusted erase bias voltage is based on a first adjusted delta voltage level.

5. The memory device of claim 4, wherein the second adjusted erase bias voltage is based on a second adjusted delta voltage level.

6. The memory device of claim 5, wherein the first adjusted delta voltage level is in a first range of approximately 10V to approximately 14V, and wherein the second adjusted delta voltage level is in a second range of approximately 3V to approximately 6V.

7. The memory device of claim 1, wherein the subset of erase loops comprises a second erase loop through a final erase loop.

8. A method comprising:
initiating, by a processing device, an erase operation including a set of erase loops to erase one or more memory cells of a memory device;
during a first erase loop of the set of erase loops:
causing a first erase pulse having an erase voltage level to be applied to a source line associated with the one or more memory cells of the memory device;
  causing a first erase bias voltage having an initial voltage level to be applied to a first select gate adjacent to the source line, wherein the first erase bias voltage is based on a first delta voltage level; and
  causing a second erase bias voltage having the initial voltage level to be applied to a second select gate associated with the source line, wherein the second select gate is adjacent to the first select gate; and
during a subset of erase loops following the first erase loop:
  causing a second erase pulse having the erase voltage level to be applied to the source line;
  causing a first adjusted erase bias voltage to be applied to the first select gate; and
  causing a second adjusted erase bias voltage to be applied to the second select gate, wherein the first adjusted erase bias voltage is less than the second adjusted erase bias voltage.

9. The method of claim 8, wherein the initial voltage level equals the erase voltage level minus the first delta voltage level.

10. The method of claim 8, wherein the first delta voltage level is in a range of approximately 0V to approximately 2V.

11. The method of claim 8, wherein the first adjusted erase bias voltage is based on a first adjusted delta voltage level.

12. The method of claim 11, wherein the second adjusted erase bias voltage is based on a second adjusted delta voltage level.

13. The method of claim 12, wherein the first adjusted delta voltage level is in a first range of approximately 10V to approximately 14V, and wherein the second adjusted delta voltage level is in a second range of approximately 3V to approximately 6V.

14. The method of claim 8, wherein the subset of erase loops comprises a second erase loop through a final erase loop.

15. A non-transitory computer-readable storage medium comprising instructions that, when executed by a processing device, cause the processing device to perform operations comprising:
initiating an erase operation including a set of erase loops to erase one or more memory cells of a memory device;
during a first erase loop of the set of erase loops:
  causing a first erase pulse having an erase voltage level to be applied to a source line associated with the one or more memory cells;

causing a first erase bias voltage having an initial voltage level to be applied to a first select gate adjacent to the source line, wherein the first erase bias voltage is based on a first delta voltage level; and causing a second erase bias voltage having the initial voltage level to be applied to a second select gate associated with the source line, wherein the second select gate is adjacent to the first select gate; and during a subset of erase loops following the first erase loop:

causing a second erase pulse having the erase voltage level to be applied to the source line;

causing a first adjusted erase bias voltage to be applied to the first select gate; and causing a second adjusted erase bias voltage to be applied to the second select gate, wherein the first adjusted erase bias voltage is less than the second adjusted erase bias voltage.

16. The non-transitory computer-readable storage medium of claim 15, wherein the initial voltage level equals the erase voltage level minus the first delta voltage level.

17. The non-transitory computer-readable storage medium of claim 15, wherein the first delta voltage level is in a range of approximately 0V to approximately 2V.

18. The non-transitory computer-readable storage medium of claim 15, wherein the first adjusted erase bias voltage is based on a first adjusted delta voltage level.

19. The non-transitory computer-readable storage medium of claim 18, wherein the second adjusted erase bias voltage is based on a second adjusted delta voltage level.

20. The non-transitory computer-readable storage medium of claim 19, wherein the first adjusted delta voltage level is in a first range of approximately 10V to approximately 14V, and wherein the second adjusted delta voltage level is in a second range of approximately 3V to approximately 6V.

* * * * *